ent Office 3,784,496
Patented Jan. 8, 1974

3,784,496
RUBBER AND AMINE MODIFIED PHENOLIC RESINS
Harry A. Smith and Erwin H. Kobel, Midland, Mich., assignors to The Dow Chemical Company, Midland, Mich.
No Drawing. Filed Feb. 24, 1972, Ser. No. 229,177
Int. Cl. C08d 9/10; C08g 37/18
U.S. Cl. 260—29.3           11 Claims

ABSTRACT OF THE DISCLOSURE

Phenolic resin adhesives having improved impact strength are obtained by reacting a phenolic-aldehyde resole with a butadiene rubber or rubber latex and ar-hydroxyaniline or a mixture of hydroxyaniline with aniline or a substituted aniline.

BACKGROUND OF THE INVENTION

The present invention relates to modified phenolic-aldehyde resin adhesives having improved toughness and other desirable physical properties. It also relates to a process for making the improved resins, to the method of bonding using such resins, and to the bonded products, particularly bonded wood products.

Phenolic-aldehyde resins, usually largely or entirely made from phenol and formaldehyde as the reactive components, are valuable adhesives, particularly for wood, and large quantities are used for making water-resistant plywood and other bonded wood products. Conventional resins of this type have certain disadvantageous properties, for example, curing or hardening of the intermediate stage resin by further reaction with formaldehyde may be undesirably slow, even at elevated temperatures, and the cured resins tend to be brittle with low resistance to impact.

Resins of this kind have been modified in the past by replacing part of the phenol in a conventional resin reaction mixture by aniline or other aromatic amine or mixture of amines. Such amine-modified resins have desirably short cure times, but they tend generally to be rigid and somewhat brittle. Consequently, these have been used more in electrical applications as molding compositions although certain classes of amine-modified phenolics have been found to be sufficiently tough to be practical wood adhesives, see our copending application, Ser. No. 151,-545, filed June 9, 1971.

Phenol-aldehyde resins have also been modified by addition of polymers such as rubber or a rubber latex. Polymers which have been used for the purpose are those which are easily compatible with phenol-aldehyde resins, for example, butyl rubber and particularly nitrile rubbers. Some improvement in resistsance to impact has been obtained in this way, but the products are often merely mechanical mixtures having reduced strength as compared to the original resin.

SUMMARY OF THE INVENTION

It has been found that resins having relatively short cure times, good adhesive properties, and substantially improved resistance to impact are obtained by reacting, in any order, a phenolic-aldehyde resole with about one to about 20 weight percent based on the resole of a butadiene rubber essentially free of nitrile groups and containing zero to about ten weight percent of carboxyl groups and about 0.05–0.5 gram mole per 100 grams of resole of an aromatic amine reactant, said aromatic amine reactant consisting essentially of ar-hydroxyaniline and zero to about 3 moles per mole of hydroxyaniline of aniline, ar-(lower alkyl)aniline, ar-(lower alkoxy)aniline, or a mixture thereof. The rubber and amine reactants are reacted with the resole at about 80° C. to the boiling point of the reaction mixture. Preferably, the resole is a predominantly ortho substituted phenol-formaldehyde reaction product.

DETAILED DESCRIPTION

In resins of the present invention, the rubber molecules are apparently at least lightly chemically bonded to the resin molecules, probably by reaction of residual olefinic bonds in the unvulcanized butadiene rubber and also possibly by reaction of any carboxyl groups present in the rubber molecule. These rubbers, or more properly rubber-like polymers, are essentially incompatible with phenol-aldehyde resins, that is, they form dispersions in the resins rather than homogeneous solutions as is characteristic of compatible rubbery polymers previously used. Surprisingly, the benefits of the invention are not obtained with relatively compatible rubber molecules containing a significant number of nitrile groups, for example, butadiene-acrylonitrile copolymers, or with rubber molecules containing more than about ten weight percent of carboxyl groups. Little or no improvement in impact strength is found when such polymers are incorporated into the amine-modified phenolic resoles described herein.

The term butadiene is used herein to mean both 1,3-butadiene and isoprene which is its common 2-methyl homolog. Thus, butadiene rubbers suitable for use in the present invention include polybutadiene, polyisoprene, and the rubbery copolymers of both butadienes with up to about 50 mole percent of other olefinic hydrocarbon monomers such as butylene, isobutylene, 2,3-dimethyl-1,3-butadiene and styrene. Also included are such polymers made by copolymerizing these monomers with one or more monoethylenically unsaturated monocarboxylic or dicarboxylic acids in proportions such that the resulting polymer contains a maximum of about ten percent by weight of carboxyl groups. Illustrative acid monomers are acrylic acid, methacrylic acid, maleic acid, fumaric acid and itaconic acid. Acrylic and methacryli acids are preferred. Either the liquid or the finely divided solid rubber polymer itself or its dispersion in a polymer latex can be employed as the butadiene rubber reactant.

The aromatic amine reactant is ar-hydroxyaniline or ar-hydroxyaniline combined with up to about 3 molar proportions of aniline, ar-(lower alkyl)aniline, ar-(lower alkoxyaniline) or a mixture of these. These latter anilines can be defined as having the formula

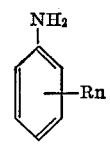

wherein each R is lower alkyl or lower alkoxy, these being of 1–4 carbon atoms, and $n$ is an integer from zero to two. Of the hydroxyanilines, m-hydroxyaniline and p-hydroxyaniline are preferred. Substituted anilines defined above include toluidine, xylidine, p-tert-butylaniline, 5-isopropyl-o-toluidine, anisidine, phenetidine, 5-methoxy-o-toluidine, dimethoxyaniline and the like.

The proportions of rubber and aromatic amine reactant are preferably interrelated such that the proportion of the rubber isabout 5–10 percent when at least 15 percent of amine reactant is employed and the proportion of rubber is increased to about 10–20 percent when less than 15 percent of amine is used, all based on the weight of resole. The minimum total of the two modifiers should thus be about 20 percent by weight.

The arylamine-resole and rubber-resole reactions can be carried out at any temperature from about 80° C. to the boiling point of the reaction mixture. The reactions are preferably run at about reflux temperature, usually for a reaction time of 0.5–5 hours. As previously noted, the reactions can be run in either order, that is, the amine-modified resole can be reacted with the rubber or rubber latex or the rubber-modified resole can be reacted with the amine reactant to obtain substantially the same result.

Substantially any resole, that is, a phenolic-aldehyde resin produced by basic or neutral catalyst initiated reaction of a phenol with up to about 2.2 mole equivalents of aldehyde and having reactive alkylol groups can be used in the present invention. The phenol reactant is preferably phenol itself or its mixture with up to ninety mole percent of a substituted phenol having at least two of the ring positions ortho and para to the phenolic hydroxyl group open and capable of reaction with an aldehyde. In some cases, a substituted phenol as defined can be used alone. Such phenols include m-cresol, resorinol, p-tert-butylphenol and the like. Representative aldehydes include formaldehyde, acetaldehyde, propionaldehyde, furfuraldehyde, benzaldehyde and mixtures thereof. The resole is preferably that produced by reacting about 0.5–1.1 mole of formaldehyde with a mole of phenol in the presence of a neutral or basic catalyst.

The term basic catalyst essentially defines the alkali metal bases, ordinarily the hydroxides and carbonates. The term neutral catalyst is used to define compounds which in water solution have a pH in the approximate range of 4–10. These compounds are typically the oxides, hydroxides and weak acid salts of Group II metals. Illustrative basic and neutral catalysts, therefore, are compounds such as sodium hydroxide, potassium carbonate, calcium acetate, magnesium acetate, zinc hydroxide, or other neutral or basic metal oxide, hydroxide or organic acid salt.

The modified resole products are cured or hardened to an infusible, insoluble state by further reaction with an aldehyde, an epoxide or a combination of the two. Preferred curing agents are formaldehyde or a combination of formaldehyde and a polyepoxide such as a polyglycidyl ether of bisphenol A, an epoxidized novolac, or the diglycidyl ether of a polyglycol. The modified resoles are curable in this way at room temperature with curing times ranging from about a minute up to about an hour depending upon the particular resin system and the kind of curing agent or combination or curing agents used. The curing time at room temperature, or at any other particular temperature, is conveniently varied by using different ratios of epoxide to formaldehyde in the curing agent, the ratio of resin to the formaldehyde in such a curing agent composition being the most critical factor. The curing time generally varies inversely according to the epoxide/$CH_2O$ weight ratio. This ratio can very between all epoxide and all formaldehyde but ratios of 10/1 to 1/1 epoxide/formaldehyde usually are most preferred.

Resin/curing agent ratios can be varied from 20/1 to 1/3 but are preferably between 4/1 to 1/1.5 by weight. Cure time also varies directly as the degree of dilution of resin and/or the curing agent in an inert solvent. Cure time varies inversely with the curing temperature. A curing temperature below normal temperature, as low as −40° C., for example, is also operable for amine-modified resins although the cure time is then somewhat longer. Slightly faster cures are obtained at high temperatures, at 150° C., for example.

As compared to somewhat similar resin adhesives of the prior art, the resins of this invention offer more versatility in that they provide broader ranges of curing rates which can be adjusted conveniently to a desired level by one or more variables such as proportion of formaldehyde or epoxide in the curing agent or by changes in the curing temperature as described above. In contrast, these variables have only limited effect on the curing rate of somewhat similar prior art resin compositions. Additionally, such analogous resin compositions when used as wood adhesives require priming of the wood surfaces to be bonded by precoating those surfaces with another phenoplast such as a resorcinol-formaldehyde resin for best results, particularly when the bond may be exposed to water. The present resins require no such priming and can be applied directly to give superior bonds.

The products of this invention are valuable adhesives for use in making water-resistant bonds in polywood manufacture or, preferably, in view of their curing characteristics, in other construction with wood. For example, these fast curing resins can be used in place of nails to bond structural members such as studs to sills, siding to wall members, flooring to floor beams or sub-flooring, and molding to wall and floor junctions. These resins also provide strong and impact-resistant bonds to cement blocks, bricks, foamed polystyrene, ceramic foams, and other building materials such that after curing the bonds at room temperature for 24 hours, or substantially less time in some cases, the substrates will usually fail under stress before the bonds break.

EXAMPLES 1–4

Preparation of rubber-modified resole

A mixture of 79.7 parts by weight of 90% phenol, 18.8 parts of 95% paraformaldehyde, 0.7 part of water, and 0.8 part of calcium acetate monohydrate was stirred while it was heated to reflux temperature over a period of 1 hour. The mixture was maintained at reflux temperature for an hour, then ten parts of rubber solids per hundred parts of resole was added as a liquid or finely divided solid rubber or a rubber latex (50% solids) as noted and refluxing was continued until the reaction mixture reached a Gardner viscosity of Z (2270 centistokes). This required about 2–5 hours. The mixture was then cooled and stored for later use.

Preparation of amine-modified resins m-hydroxyaniline (MHA)

Mixtures of 100 g. of rubber-modified resole and 33 g. (0.305 mole) of m-hydroxyaniline were heated at reflux temperature for two hours, then cooled. Ten gram portions of the resulting product were cured at room temperature by mixing with 5 grams of an equal mixture of 55% methanolic formaldehyde and an epoxidized novolac made by reacting epichlorohydrin with a phenol-formaldehyde novolac, epoxy equivalent weight=172–179.

Aniline-m-hydroxyaniline (A-MHA)

A mixture of 160 g. of rubber-modified resole and 22.7 g. (0.153 mole) of aniline was heated at reflux for one hour. Then 26.7 g. (0.150 mole) of m-hydroxyaniline was added and refluxing was continued for another hour. Ten gram portions of the product were cured at room temperature by mixing with five grams of a 7:1 mixture (by weight) of a bisphenol A-epichlorohydrin adduct, epoxy equivalent weight=186–192, and 55% methanolic formaldehyde.

Resin testing

The gel time for each sample was determined by ASTM method D–2471–68. The samples were tested as good adhesive using a 24 hour cure at room temperature and 2–2.5 p.s.i. pressure and then testing by standard methods ASTM D–1344–57 (a cross-lap test) and ASTM D–950–57 (impact strength). Douglas fir was the wood used in all tests and the data are ranges or averages found in each test for a set of three samples. The results are listed in Table I. Examples A–D are comparative examples showing the results obtained when the resoles are cured with no added rubber or latex or with a rubber or latex outside the scope of the invention.

TABLE I

| Ex. No. | Resin type | Rubber additive | Cure time, minutes | Cross-lap strength, p.s.i. | Impact strength, ft.-lbs./sq. in. |
|---|---|---|---|---|---|
| A | MHA | None | 0.25 | 135 | 2.9 |
| 1 | MHA | Hycar CTB [1] | 0.5 | 120 | 16.0 |
| 2 | MHA | Latex X [2] | 0.33 | 180 | 16.0 |
| 3 | MHA | Latex Y [3] | 0.25 | 165 | 16.0 |
| B | MHA | Latex Z [4] | 0.33 | 200 | 3.0 |
| C | MHA | Hycar CTBN [5] | 0.5 | 230 | 4.6 |
| D | A-MHA | None | 11 | 240->300 | 6.0 |
| 4 | A-MHA | Latex Y [3] | 8 | 180-210 | 12.0 |

[1] [5] Hycar CTB is an acrylic acid-butadiene rubber, Hycar CTBN is an acrylic acid-butadiene-acrylonitrile rubber.

[2] [3] [4] Latex X is a styrene-butadiene rubber latex. Latexes Y and Z are similar except that the polymer is modified by copolymerization with acrylic acid to provide 5% and 20% by weight respectively of carboxylic acid moieties. The actual proportions were: X, 40–60 styrene-butadiene, Y, 40–55–5 styrene-butadiene-acrylic acid, and Z, 40–40–20 styrene-butadiene-acrylic acid.

Examples 1–4 illustrate the great improvement in impact strength provided by rubbers within the invention as compared to A and D where no rubber was added and to B and C where the rubber contained respectively too high a carboxyl group concentration and nitrile groups.

EXAMPLES 5–10

Rubber-modified resoles were made as described in Examples 1–4 using different amounts of latex Y as the rubber component. These were further reacted with an aromatic amine reactant as shown above using 10 g. of m-hydroxyaniline per 100 g. of resole for the MHA type resins and quantities of aniline and m-hydroxyaniline as shown in Example 4 for the A-MHA type resins. These products were cured by diluting 10 g. samples with 1.7 ml. of methanol and mixing in 5 g. of a 7:1 mixture of the bisphenol A-epichlorohydrin adduct and 55% methanolic formaldehyde described previously. Testing as in Examples 1–4 provided the data in Table II.

TABLE II

| Ex. No. | Resin type | Rubber solids, percent of resin | Cure time, minutes | Cross-lap strength, p.s.i. | Impact strength, ft.-lbs./sq. in. |
|---|---|---|---|---|---|
| E | MHA | 0 | 1 | 210–230 | 6.0 |
| 5 | MHA | 5 | 2.5 | 145–320 | 6.5 |
| 6 | MHA | 10 | 5 | 260–340 | 8.0 |
| F | A-MHA | 0 | 15–27 | 310–290 | 6.5 |
| 7 | A-MHA | 1 | 20 | 190–210 | 9.4 |
| 8 | A-MHA | 2 | 30 | 140–155 | 10.5 |
| 9 | A-MHA | 5 | 25 | 190–360 | 13.2 |
| 10 | A-MHA | 10 | 29 | 210–215 | >14 |

Examples 5–6 and 7–10 again demonstrate the substantial advantage gained in impact strength by adding progressively more rubber to the resin as compared to control Examples E and F, respectively in which no rubber was used.

EXAMPLE 11

Results similar to those shown in Tables I and II were obtained when the ruber solids were added to the resole after reaction with the aromatic amine. For example, 9.8 g. of the uncured A-MHA resin of Example F was mixed with 0.2 g. of latex Y and then 5 g. of the curing agent mixture of Examples 4–10 was added. The resulting mixture had a room temperature cure time of 30 minutes, a cross-lap bond strength of about 150 p.s.i. and an impact strength of 10.5 ft. lbs./sq. in.

EXAMPLE 12

A rubber-modified resin and the same resin containing no rubber were made up and cured as in Examples 10 and F, respectively except that m-anisidine was substituted for the aniline reactant. Proportions and reactants were otherwise the same. The testing data listed in Table III clearly shows the advantage in impact strength provided by the present invention.

TABLE III

| Example number | Rubber additive | Cure time, minutes | Cross-lap strength, p.s.i. | Impact strength, ft.-lbs./sq. in. |
|---|---|---|---|---|
| G | None | 17 | 215–270 | 7.8–9.6 |
| 12 | Latex Y | 40 | 290–295 | 9.3–13.1 |

Results similar to those shown in the above examples are obtained when the same amount of o-hydroxyaniline or p-hydroxyaniline is substituted for the m-hydroxyaniline reactant which is shown. In the same way, no substantial change in the properties of the final resin product is found when a mole equivalent quantity of a substituted aniline such as p-toluidine, 2,5-xylidine, 5-isopropyl-o-toluidine, phenetidine, 5 - methoxy-o-toluidine, or 3,4-dimethoxyaniline is used in place of aniline or m-anisidine as shown in Examples 4, 7–10, 11 and 12, respectively.

Additionally, comparable improvement in resistance to impact in the final resin is obtained when the butadiene rubber shown in the above examples is replaced by the same quantity of unvulcanized natural rubber or rubber latex or by rubbery polymers of butadiene with isoprene, isobutylene, m-butylene, styrene and the like as previously defined.

We claim:

1. A curable rubber and amine-modified phenolic resin which comprises the product obtained by reacting at about 80° C. to the boiling point of the reaction mixture a phenolic-aldehyde resole made by reacting phenol or a mixture of phenol with up to ninety mole percent of a substituted phenol having at least two of the ring positions ortho and para to the phenolic hydroxyl group open and capable of reaction with an aldehyde with up to about 2.2 mole equivalents of aldehyde in the presence of a neutral or basic catalyst, about one to about 20 weight percent based on the resole of an unvulcanized butadiene rubber essentially free of nitrile groups and containing zero to about 10 weight percent of carboxyl groups, and about 0.05–0.5 gram mole per 100 grams of resole of an aromatic amine reactant, said reactant consisting essentially of ar-hydroxyaniline and zero to about 3 moles per mole of hydroxyaniline of at least one aniline of the formula

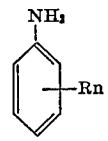

wherein $n$ is an integer from 0 to 2 and each R is lower alkyl or lower alkoxy.

2. The resin of claim 1 wherein the resole is a predominantly ortho substituted phenol-formaldehyde resole.

3. The resin of claim 2 wherein the rubber is a butadiene-styrene copolymer latex.

4. The resin of claim 2 wherein the aromatic amine reactant is m-hydroxyaniline.

5. The resin of claim 2 wherein the aromatic amine reactant is a mixture of m-hydroxyaniline and aniline.

6. The reaction product of the resin of claim 2 and a phenolic resin curing agent which is a source of formaldehyde, a polyepoxide or a mixture thereof.

7. A process for making an impact-resistant phenolic resin which comprises reacting in any order at about 80° C. to about the boiling point of the reaction mixture a resole resin made by reacting phenol or a mixture of phenol with up to ninety mole percent of a substituted phenol having at least two of the ring positions ortho and para to the phenolic hydroxyl group open and capable of reaction with an aldehyde with up to about 2.2 mole equivalents of aldehyde in the presence of a neutral or basic catalyst with about one to about 20 percent based on the weight of resole of an unvulcanized butadiene rubber essentially free of nitrile groups and containing zero to about ten weight percent of carboxyl groups, and about 0.05–0.5 gram mole per 100 grams of resole of an aromatic amine reactant, said reactant consisting essentially of ar-hydroxyaniline and zero to about 3 moles per mole of hydroxyaniline of at least one aniline of the formula

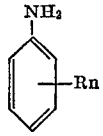

wherein $n$ is an integer from 0 to 2 and each R is lower alkyl or lower alkoxy.

8. The process of claim 7 wherein the resole is a predominantly ortho substituted phenol-formaldehyde resole.

9. The process of claim 8 wherein the rubber is a butadiene-styrene copolymer latex.

10. The process of claim 8 wherein the aromatic amine reactant is m-hydroxyaniline.

11. The process of claim 8 wherein the aromatic amine reactant is a mixture of m-hydroxyaniline and aniline.

References Cited
UNITED STATES PATENTS

| | | | |
|---|---|---|---|
| 3,518,159 | 6/1970 | Freeman et al. | 260—838 |
| 3,639,330 | 2/1972 | Fitzhugh et al. | 260—844 |
| 3,598,690 | 8/1971 | Danielson | 260—846 |
| 3,517,722 | 6/1970 | Endter et al. | 260—846 |
| 3,507,689 | 4/1970 | Freytag et al. | 260—848 |

JOHN C. BLEUTGE, Primary Examiner

U.S. Cl. X.R.

156—330, 331, 334; 161—184, 262; 260—831, 834, 845, 846